United States Patent [19]
Kinzenbaw

[11] 3,817,333
[45] June 18, 1974

[54] PLOW SYSTEM WITH PLURALITY OF PLOW UNITS AND MEANS FOR ADJUSTING SPACING BETWEEN UNITS IN A CONTINUOUS MANNER

[75] Inventor: Jon E. Kinzenbaw, Ladora, Iowa
[73] Assignee: Dietrech Manufacturing, Inc., Goodfield, Ill.
[22] Filed: Feb. 16, 1972
[21] Appl. No.: 226,903

[52] U.S. Cl................................. 172/283, 172/285
[51] Int. Cl............................................. A01b 69/00
[58] Field of Search .......... 172/166, 218, 285, 221, 172/291, 283, 287, 576, 569, 616, 647, 667, 679

[56] References Cited
UNITED STATES PATENTS

| | | | |
|---|---|---|---|
| 16,912 | 3/1857 | Frye | 172/647 X |
| 829,558 | 8/1906 | Weeks | 172/283 |
| 1,014,987 | 1/1912 | Weiler | 172/569 X |
| 1,547,291 | 7/1925 | Bechdholt | 172/647 |
| 2,128,602 | 8/1938 | Davenport | 172/413 |
| 2,564,567 | 8/1951 | Ego | 172/166 |
| 2,834,274 | 5/1958 | Barrett | 172/569 X |
| 3,305,025 | 2/1967 | Johnson et al. | 172/218 |
| 3,503,454 | 3/1970 | Oerman | 172/291 |
| 3,605,904 | 9/1971 | Rutterford | 172/285 X |

FOREIGN PATENTS OR APPLICATIONS
481,234   2/1952   Canada.............................. 172/166

Primary Examiner—Stephen C. Pellegrino
Attorney, Agent, or Firm—Dawson, Tilton, Fallon & Lungmus

[57] ABSTRACT

A plurality of plow units are mounted to a main frame of a plow system for rotation about their vertical axes. The plow units are spaced at equal lateral increments and at uniformly increased distances from a pivot connection between the main frame and a traction vehicle. The plow units are ganged together by means of a guide beam; and a power actuator controls the motion of the guide beam in rotating the plow units so that their cut lines take a predetermined position relative to the main frame. As the plow system is then used to plow ground, the main frame swings about its pivot connection to the tractor until the plow units line up with the direction of travel of the tractor, thereby adjusting the spacing between plow units automatically. The rear plow unit is mounted to a tail section which is pivotally mounted to the main frame and includes a rear wheel for supporting the distal end of the main frame and for steering the system as the tractor turns. A second power actuator is adapted to lift the main frame relative to the rear wheel for adjusting plow depth or pulling the system over ground without plowing it.

9 Claims, 6 Drawing Figures

PLOW SYSTEM WITH PLURALITY OF PLOW UNITS AND MEANS FOR ADJUSTING SPACING BETWEEN UNITS IN A CONTINUOUS MANNER

BACKGROUND AND SUMMARY

The present invention relates to farm implements; and more particularly, it relates to a plow system wherein a plurality of individual plowing units are mounted to a common frame adapted to be pulled by a traction vehicle for plowing a plurality of furrows simultaneously.

Plow systems are known which include a plurality of plow units mounted to a common or main frame which is adapted to be pulled behind a traction vehicle. For the most part, such systems have the plow units rigidly mounted at predetermined intervals along a main beam which is inclined relative to the direction of travel of the vehicle. Thus, the plow units are mounted at different lateral spacings and at different differences behind the vehicle so that a trailing plow unit will turn plowed earth into a furrow formed by a preceding plow unit. These systems have had the capability of adjusting the spacing between furrows formed by the plurality of plow unit. Heretofore, however, adjusting the spacing of plow units has been a tedious, time-consuming task and intended to be employed only when the attachment is, for example, pulled by a different vehicle or used under circumstances other than those under which it is normally employed. Adjustment was made by changing at least some of the bolt holes of each plow unit in securing it to the frame, thus, prior plow systems which have a number of individual plow units have not been designed to facilitate adjustment of the spacing of the plow units.

I have realized that in the normal operating conditions under which a farmer uses a system or attachment of this type, there are considerable advantages to be gained in a system wherein the plow units may be easily adjusted by an operator without even leaving the tractor, and, further, by permitting a continuous variation of the spacing of the plow units over a fairly wide range. That is to say, even those prior plow systems which permitted adjustment of the spacing between adjacent plow units permitted only discrete spacing intervals, such as 14 inches or 16 inches or 18 inches. My improved plow unit, on the other hand, permits adjustment over a continuous range of plow unit spacing from, say, 14 inches out to 20 inches, while, at the same time, permitting the adjustment to be made by an operator very quickly and easily without leaving his seat on the tractor.

Some of the factors which have an influence on the desired width of a cut between adjacent plow units (the word "adjacent" does not apply side-by-side spacing, of course, because one of the units trails the other) are the type of soil being worked, the type of crop being worked under, the size of the tractor, the degree of dampness of the ground being worked, the inclination and slope direction of a hill or mound, etc. The depth of the furrows being made may also have an influence on the desired width of a cut, although to a lesser degree than the other factors. For example, if a clay coil is being worked, the spacing between adjacent plow units may be desired to be 14 inches. If corn is the crop being worked under, and a normal loam is present, the spacing between adjacent plow units may be 14 or 16 inches or even wider if the tractor has a larger horsepower. A damp ground will require closer spacing of adjacent plow units than a dry ground because the pulling vehicle does not have as great a traction on damp ground, and so on.

Typically, a plow system of the type with which the present invention is concerned may have as many as five separate plow units mounted to it. Hence, if the pulling vehicle has a small or medium size motor, the spacing between adjacent plow units may range between 14 and 16 inches, thereby providing a total swath of up to 80 inches. If the operator changes to a tractor of higher horsepower (and it will be realized that these units normally last longer than a typical tractor), the operator can save hours of work by adjusting the width between adjacent plow units to as high as 20 inches, whereby the total swath for a single pass is 100 inches—an increase of 20 per cent. This, of course, is accomplished, under the present invention without having to purchase a new plow system.

According to my invention, a plurality of plow units are each mounted to a main frame of a plow system for rotation about a vertical axis. The units are mounted to a main beam which is inclined relative to the direction of travel of the vehicle, and the units are spaced at equal lateral increments along the inclined main beam so that when the system is attached to a traction vehicle, the plow units are located at uniformly increased distances from a pivot connection between the main frame and the traction vehicle.

The plow units are ganged together by means of a guide beam which preferably is located parallel to the inclined main beam of the frame and pivotally attached to flanges on the plow beam of each plow unit. A plow share and moldboard are attached to the plow beam behind the inclined main beam, and a rolling coulter is attached to the plow beam ahead of the inclined main beam. A hydraulic ram interconnects the guide beam with the main frame for translation of the guide beam relative to the main inclined beam, and hence, for rotating the individual plow units together relative to the inclined main beam. As the plow units are rotated, the moldboards and plow shares "open" or "close"—that is to say, the direction of cutting (i.e., the cut line) of the plow units changes. Thus, when the units are then used to plow, the reaction force straightens the units out relative to the direction of travel of the vehicle and causes the entire main frame to rotate about the pivotal connection to the traction vehicle. That is, the individual plow units being turned in unison, will adjust so as to "face" or become aligned with the direction of travel of the pulling vehicle.

Another advantage of the present invention is that the operator of the traction vehicle may maintain the spacing with previous furrows by keeping the right rear wheel (when viewed from the rear) in a previous furrow. Thus, if the lateral spacing of adjacent plow units is 16 inches, the leading or right-hand plow unit (again, when viewed from the rear) will be located 16 inches from a previously formed furrow. Similarly, if the operator changes the spacing between plow units to 18 inches, then the right-hand plow unit will shift laterally to the left two inches relative to its previous position so that by maintaining the right rear wheel in the previously formed furrow, the spacing between that furrow and the leading plow unit will be adjusted 18 inches.

A tail section is mounted to the tail end of the inclined main beam, and it is provided with a wheel support which rides in the last formed furrow. A second hydraulic ram is included in the tail section for lifting the rear end of the inclined main beam relative to the trailing wheel, thereby to permit raising of the plow units above the ground when traveling over roads or ground that is not desired to be plowed or for adjusting plowing depth.

A steering system is also included to steer the rear wheel in a reverse direction relative to the direction of turning of the tractor to bring the plow system or attachment around directly behind the traction behicle during turns.

Other features and advantages of the present invention will be apparent to persons skilled in the art from the following detailed description of a preferred embodiment accompanied by the attached drawing wherein identical reference numerals will refer to like parts in the various views.

THE DRAWING

DETAILED DESCRIPTION

Figure 1:
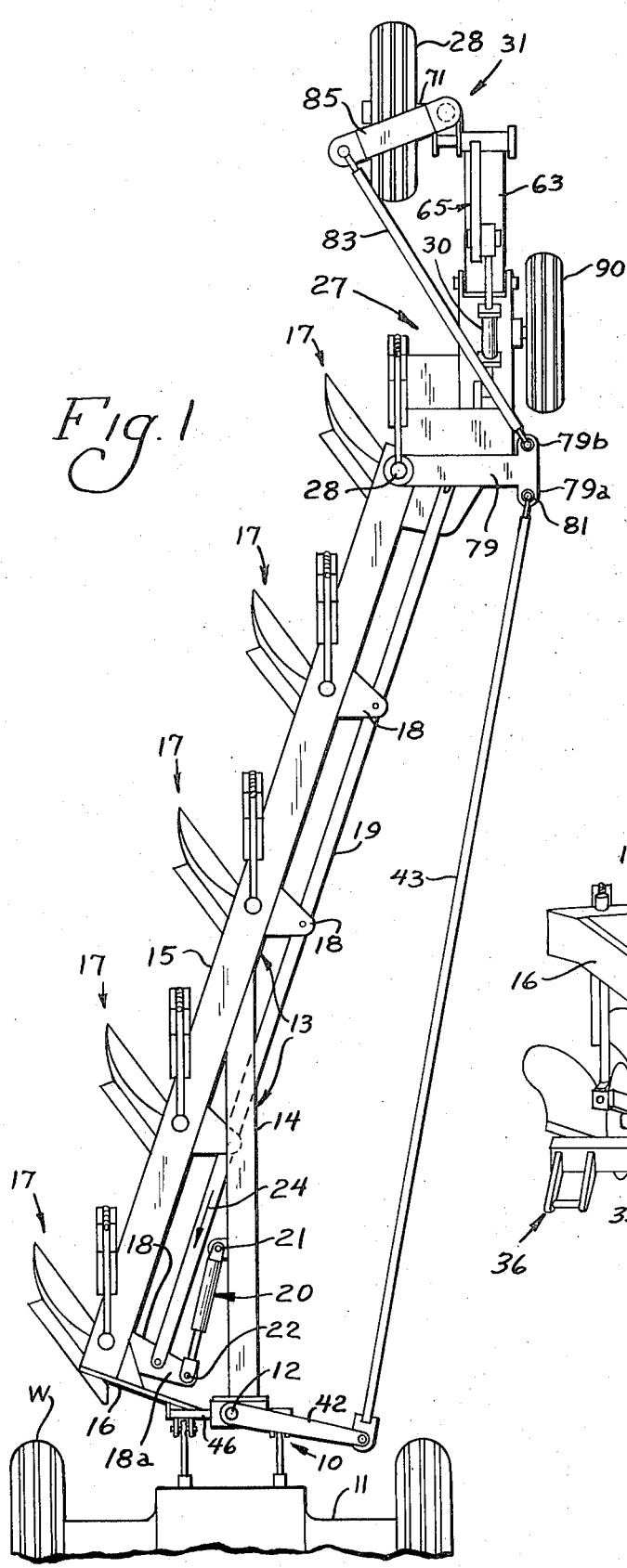
FIG. 1 is a plan view of a plow system constructed according to the present invention.

Turning first to FIG. 1, the plow system or attachment includes generally a hitch 10 for connecting to the rear of a tractor 11 and including a vertical pivotal connection 12 about which a main frame 13 of the illustrated plow attachment may rotate. The main frame 13 includes a beam 14 extending generally in the direction of travel of the tractor 11, an inclined main beam 15 welded to the rear end of the longitudinal beam 14, and a brace bar 16. Pivotally mounted to the inclined main beam 15 are five plow units generally designated by reference numeral 17. All of the plow units 17 may be similar so that only one need be discussed in further detail in order to fully understand the invention. The forward end of each of the plow units 17 is provided with a connecting flange 18 which is pivotally connected to a guide beam 19 which extends parallel with the inclined main beam 15. A hydraulic cylinder and piston rod unit generally designated by reference numeral 20 (sometimes referred to as a hydraulic ram) is pivotally connected at one end to the longitudinal beam 14 as at 21 and pivotally connected at its rod end as at 22 to an extension 18a of the connecting flange 18 of the leading plow unit 17.

It will be observed from FIG. 1 that when the plow units are adjusted to their approximate mid-position, as illustrated, the axis of rotation of each unit and the pivotal connection between the unit and the guide beam 19 (by means of connecting flange 18) both lie along a line which extends perpendicular to the axis of the guide bar 19—i.e., perpendicular to the direction of movement of the guide bar. This arrangement has the advantage that it enhances the leverage or mechanical advantage exerted on the plow unit by the ram 20, and it is useful not only in adjusting the lateral separation of the plow units while plowing, but in holding those units in the desired lateral spacing.

Figure 6:
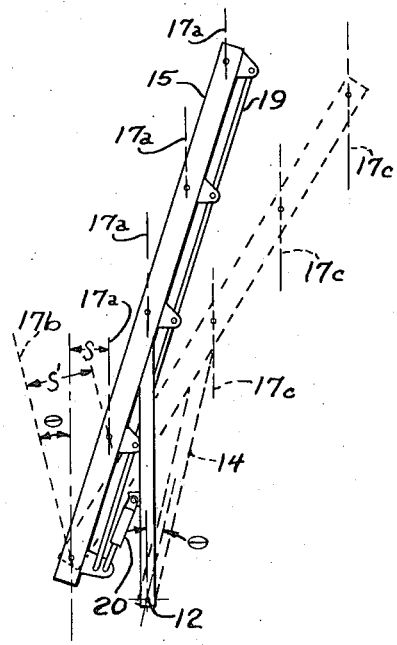
FIG. 6 is a schematic diagram illustrating the adjustment of spacing between adjacent plow units.

The ram 20 is a double-acting hydraulic ram, and the lines may be run along the longitudinal beam 14 to a conventional power take-off on the tractor 11, with the controls mounted for easy access for the operator of the tractor 11. When the ram 20 is expanded, the extension 18a of the connecting flange 18 of the leading plow unit is rotated in a clockwise direction, thereby rotating the entire leading plow unit clockwise. This action translates the guide beam 19 axially in the direction of the arrow 24, thereby rotating all of the remaining connecting flanges 18 and there associated plow units clockwise. This action "closes" adjacent units—that is, the spacing between vertical planes passing through the pivotal connections of the plow units and extending in the cutting or plowing direction of each unit comes closer together. By contracting the ram 20, the guide beam 19 is moved rearward relative to the inclined main beam 15, but remains parallel to it. This action "opens" adjacent plow units to increase the spacing between adjacent plow units. The adjustment action is diagrammatically illustrated in FIG. 6 wherein the individual plow units are not illustrated for clarity, but their directions of cutting are indicated by the chain lines 17a for the main frame shown in solid line. It will be observed that the cutting lines of the plow units are always in the forward direction of travel of the tractor—that is, because of the structure of the plow units, which may be conventional, they have a tendency to straighten themselves out when they are pulled through ground. The resistance forces of the ground act on the plow share and coulter and moldboard much like a rudder action. When it is desired to increase the lateral spacing of the plow units, the hydraulic cylinder 20 is contracted, thereby rotating the cutting line of the leading plow unit from the chain line 17a to that indicated by the dashed line 17b. Due to the pivotal connection of the individual plow units to the inclined main beam 15, and the ganging of all of the plow units via the guide beam 19, all of the plow units are rotated counterclockwise. The schematic illustration of FIG. 6 is exaggerated to depict the principle involved; however, the inclination of the cutting line 17a is rotated through the angle $\theta$ to the orientation 17b. It will be observed that this rotation increases the lateral spacing of adjacent plow units from the distance between chain lines, indicated by S, to the distance between dashed lines, indicated by the distance S'.

When the attachment is then used to work ground, the tendency of the individual plow units to straighten themselves (indicated diagrammatically by the vertical dashed lines 17c in FIG. 6), the frame of the attachment will be rotated about the pivotal connection 12 to the position shown in dashed line.

It will be noted that the present invention advantageously achieves the following advantages while effecting this adjustment: (1) the lateral spacing of each adjacent pair of plow units remains constant for a given setting of the hydraulic ram 20 to insure constant spacing of adjacent furrows for all settings of the plow units; (2) the movement of the individual plow sections to the right is progressive—that is, if the leading plow unit moves two inches to the right, then the second plow unit will move four and the third six, and so on to maintain constant furrow spacing; and (3) the leading plow unit is shifted laterally along with the rest, although by a smaller distance, relative to the right rear wheel of the tractor 11 (designated W in FIG. 1). The latter of the above-enumerated advantages permits an operator to keep the wheel W in a previously formed furrow and still be assured that the spacing between the previously formed furrow and the furrow being cut by the leading plow unit is the same as the lateral spacing of all adjacent pairs of plow units.

It will be observed from FIG. 6 that the longitudinal center line of the longitudinal frame beam 14 moves through the same angle θ as does the cutting line of each plow unit. Each of the pivotal connections of the individual plow units moves through the same angle θ. These pivotal connections are located at multiples of a predetermined distance from the pivotal connection 12, so that if, for example, the distance between the pivotal connection of the first plow unit and the pivotal connection 12 is R, then the distance between the pivotal connection of the second plow unit and the pivotal connection 12 to the tractor hitch is 2R, and so on. It will thus be appreciated that the lateral displacement of the plow units becomes a function of the turning of a plow unit through the angle θ, and that the displacement of the plow units is progressive because they are preferably located at multiples of the distance between the pivotal connection 12 and the pivotal connection of the first plow unit.

Returning now to FIG. 1, the trailing end of the inclined main beam 15 is supported by a trailer section generally designated by reference numeral 27 which is pivotally connected at 28 to the inclined main beam 15. The rearmost plow unit is carried by the trailing section 27, in a manner to be disclosed presently, and the entire trailing section 27 is turned when the guide beam 19 is translated. Attached to the rear of the trailer section 27 is a support wheel 28, and it is located in a manner to always follow in the furrow formed by the rearmost plow unit during plowing. This is accomplished because the entire trailer section 27 is rotated as a unit with the rearmost plow unit. The trailer section 27 is also provided with a hydraulic ram 30 for raising the junction between the main frame 13 and the trailer section 27 relative to the support wheel 28 to lift the plow units off the ground when the plow system is being transported over roads and the like.

A steering mechanism generally designated by reference numeral 31 is responsive to the turning of the tractor 11, as will be described presently, to turn the rear support wheel 28 in an opposite direction and thereby move the trailing end of the attachment outwardly during a turn to keep it behind the tractor, in a manner in which very long hook-and-ladder fire trucks are steered.

Figure 2:
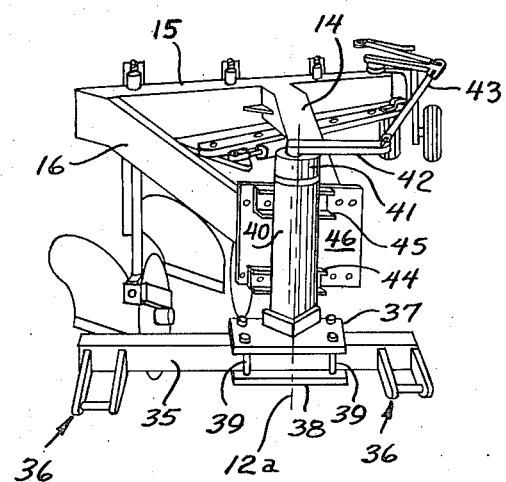
FIG. 2 is a front, upper perspective view of the plow system of FIG. 1.

Turning now to FIG. 2, the hitch 10 includes a transverse rectangular bar 35 at the ends of which are mounted conventional hitching mechanisms generally designated 36 for securing to the rear end of a traction vehicle while permitting rotation about a horizontal axis. A base including upper and lower plates 37 and 38 are secured to the transverse bar 35 by means of four corner bolts 39. If the bolts 39 are loosened, the base may be adjusted laterally of the transverse bar 35 so as to accommodate the attachment to tractors of different wheel base. This fixes the distance between the right rear wheel W of FIG. 1 which rides in a previously formed furrow, and the pivotal axis 12, also illustrated in FIG. 1. The pivotal axis 12 is diagrammatically illustrated in FIG. 2 by the vertical line 12a, and this is also the center line of a vertical shaft rotatably mounted within a sleeve 40. The top of the shaft is provided with a collar as at 41, and the bottom of the shaft is welded to the horizontal plate 37. Thus, the shaft received within the sleeve 40 rotates with the crossbar 35—that is, when the tractor is turned. At the top of the collar 41, there is provided a laterally extending arm 42 to the distal end of which a tie-rod 43 is pivotally connected.

First and second channel members 44 and 45 are provided with suitable cutouts and welded at vertically spaced positions to the sleeve 40. A vertical plate 46 is welded to the back sides of the channel members 44, 45. The end frame member 16 and the longitudinal box frame member 14 are welded to the back of the plate 46.

Figure 5:
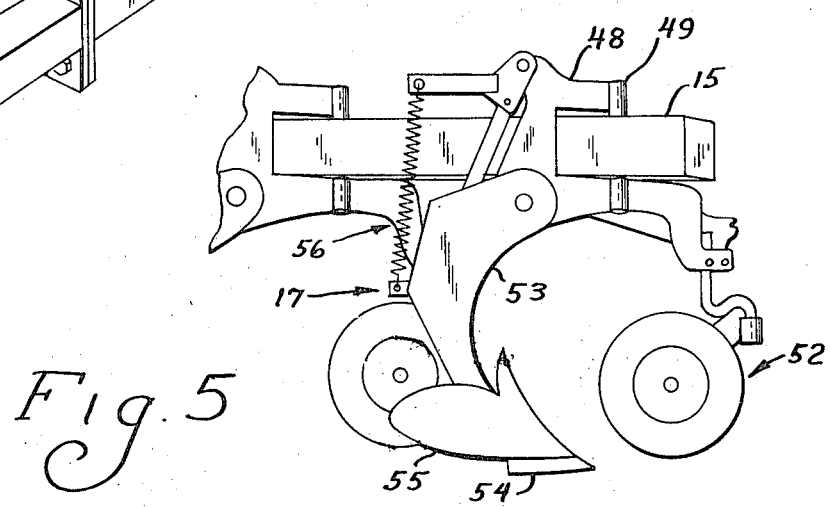
FIG. 5 is a side view of an individual plow unit.

Turning now to FIG. 5, one of the individual plow units can be seen in greater detail. A C-shaped yoke 48 straddles the inclined main beam 15 from the side and extends rearwardly thereof. The forward ends of the yoke 48 are connected to a vertical shaft 49 which is rotatably mounted in the inclined main beam 15. Thus, the yoke 48 is permitted to rotate about a vertical axis. To the forward end of the bottom end of the yoke 48, there is mounted a rolling coulter 52 in conventional fashion. To the back of the yoke 48 there is pivotally mounted a plow shank 53 at the lower end of which is connected a plow share 54 and a moldboard 55. The plow shank 53 may be connected by means of a spring trip generally designated 56 so that if an immovable obstruction is reached, the plow share will be rotated upwardly out of engagement with the ground to prevent damage. As already mentioned, the plow unit illustrated may be of conventional design, but the one shown represents a preferred embodiment.

Figure 3:
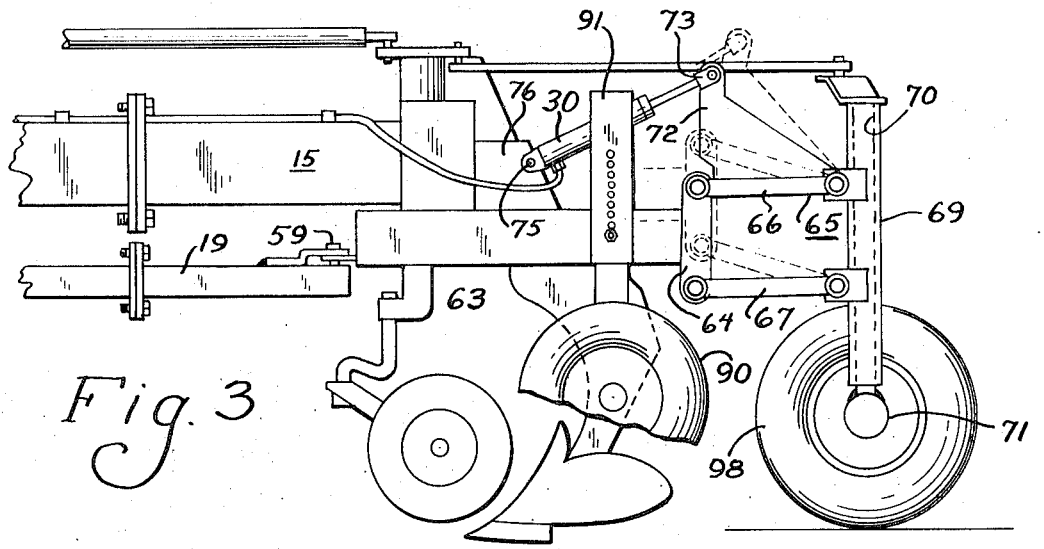
FIG. 3 is a fragmentary side view of the tail section of the plow system of FIG. 1.
Figure 4:
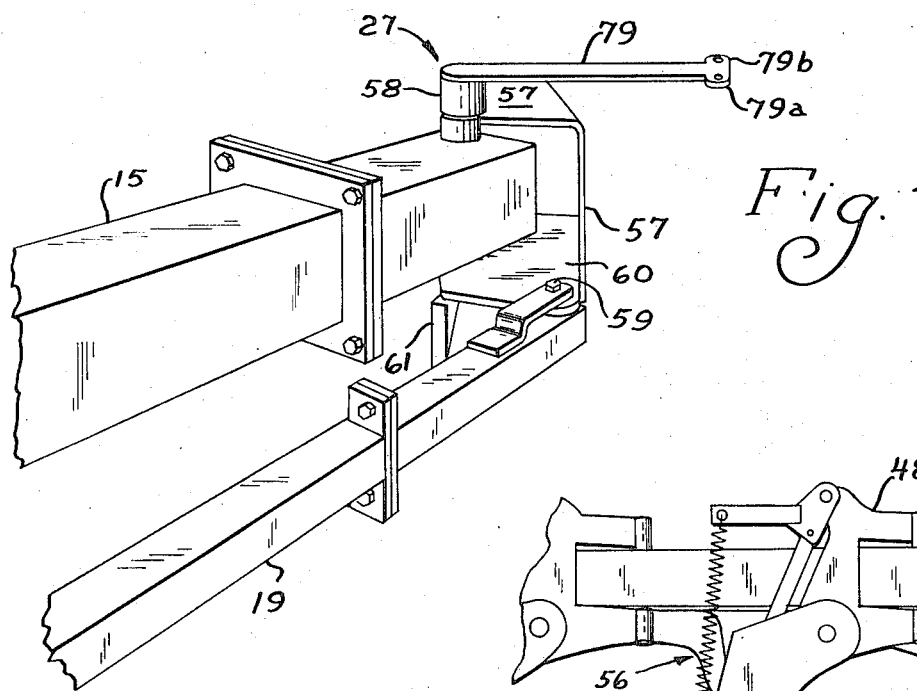
FIG. 4 is an upper perspective view of the tail section of FIG. 3 with the tie rods removed.

Turning now to FIG. 3 and 4 which illustrate the tail section 27, a box frame 57 is pivotally connected by means of a collar 58 to the distal end of the inclined main beam 15 for rotation about a vertical axis. The distal end of the guide beam 19 is pivotally connected at 59 to a lower extending flange 60 of the box frame 57. The rearmost plow unit 17 is welded to a vertical plate 61 extending from the bottom of the flange plate 60. Thus, as the guide beam 19 is translated forward and aft, the entire tail section including the rearmost plow unit rotates as a unit.

The box frame 57 is welded to the top of a rear tail beam 63 to the distal end of which is mounted a vertical link 64. The vertical link 64 forms a forward link in a parallelogram linkage generally designated 65 which includes upper and lower horizontal links 66 and 67 pivotally connected of their forward ends to the vertical links 64 and a rear link comprising a vertical sleeve 69 pivotally connected to the rear ends of the horizontal links 66, 67. The ends of the vertical shaft 69 extend above and below the associated horizontal links 66, 67, and journaled within it is a vertical shaft 70, to the bottom of which is connected a laterally extending arm 71 (seen best in FIG. 1). The arm 71 forms an axle for the trailing wheel 28.

Welded to the upper portion of the top horizontal link 66 is a brace plate 72 at the top of which is mounted a base 73 for a pivotal connection of the hydraulic ram 30. The forward end of the hydraulic ram 30 is pivotally connected as at 75 to a vertical flange 76 formed about the periphery of the box frame 57, as best seen in FIG. 3. When the ram 30 is expanded, it will cause the parallelogram linkage 65 to assume the position shown in dotted line—that is, it will vertically lift the trail beam 63. This may be used to set the depth of plowing as well as to lift all of the plow units above the ground. However, in order to lift all of the plow units off the ground, the hitch lift mechanism of the tractor is used to lift the forward end of the attachment. Such lift mechanisms are normally provided on tractors and need not be described any further here.

Referring now to FIG. 4, a link 79 is welded to the collar 58 to extend laterally thereof which is provided with two apertured flanges 79a and 79b. Referring now particularly to FIG. 1, the distal end of the tie rod 43 is pivotally connected as at 81 to the flange 79a of the horizontal link 79 which pivots about the axis 28. A second tie rod 83 is pivotally connected between the flange 79b of the horizontal link 79, and the outboard end of a second horizontal link member 85 which is rigidly secured to the top of the shaft 70 for turning the trailing wheel 28.

As viewed in FIG. 1, if the tractor were turning to the right, the vertical shaft 12 (best seen in FIG. 2) rotates counterclockwise because it is rigidly connected to the crossbar 35 by means of the plates 37, 38 and the bolts 39. This action causes the tie rod 43 to move rearwardly thereby rotating the T-bar linkage 79 counterclockwise and pushing the tie rod 83 rearwardly. This, in turn, rotates the rear horizontal link 85 clockwise with the shaft 70, turning the trailing wheel 28 to the left. Thus, as the tractor enters a turn, the trailing wheel 28 turns in an outward direction to move the trailing end of the attachment into a wire turning radius and to keep the attachment behind the tractor. The tie rods are not shown in FIG. 4 for clarity, nor is the bottom of the rearmost plow unit.

It will be observed that because the trailing or rearmost plow unit is connected to the tail section 27, as is the trailing wheel 28, the trailing wheel 28 will always be lodged in the furrow formed by the rearmost plow unit, although this is not necessary to practice the invention. That is, the trailing wheel could be displaced laterally to travel on flat ground and not in a furrow, for example. In other words, as the plow units are rotated, the tail section will also be rotated about the vertical pivotal axis 28, and since the tail wheel 28 is located directly behind the rearmost plow unit 17, it will always follow in the furrow formed by that unit. In order to best accomplish this, a parallelogram is formed by the following four pivotal points: (1) the pivotal connection 12 at the hitch; (2) the pivotal connection between the tie rod 43 and the arm 42; (3) the connection between the flange 79a of arm 79 and tie rod 43; and (4) The connection between the base of arm 79 and the tail end of the inclined beam (i.e., the tail section connection) which is also the pivotal connection of the rearmost plow unit.

By thus arranging the steering mechanism for the tail or "steering" wheel 28, the tail wheel will always be steered in a direction opposite to the direction in which the tractor is turned to thereby swing the tail section around behind the tractor. Further, the steering mechanism, by virtue of the parallelogram arrangement just mentioned, will cause the tail section to turn as the plow units are opened or closed to bring the tail wheel behind the rearmost plow unit and to cause it to become aligned with the rearmost plow unit in the direction of travel of the vehicle. From this position, the tail wheel is still capable of being steered as the vehicle turns. I refer to this parallelogram arrangement as a compensating means in the steering mechanism.

For example, if the plow units are opened from the position of FIG. 1 (to plow furrows spaced further apart), the distal end of the inclined beam will rotate clockwise about the hitch and cause the tail wheel to be rotated counterclockwise, thereby steering the tail section to the right in FIG. 1 to accommodate the wider spacing of plow units. As the tail section is moved to the desired setting, the compensating means mentioned automatically straightens out the tail wheel which thereafter follows in the furrow of the rearmost plow unit.

A second support wheel, designated 90 in FIGS. 1 and 3 is adjustably mounted by means of a vertical beam 91 for engaging the ground during plowing to limit the depth of plowing.

Having thus described in detail a preferred embodiment of the present invention, persons skilled in the art will be able to substitute equivalent elements for those which have been disclosed and to modify certain of the structure illustrated while continuing to practice the principle of the invention; and it is, therefore, intended that all such modifications and substitutions be covered as they are embraced within the spirit and scope of the appended claims.

I claim:

1. In a plow system adapted to be pulled behind a traction vehicle and including a plurality of plow units each provided with a ground-working implement, and a main frame including a main horizontal beam inclined relative to the direction of travel of said plow system, and connected to said tractor for rotation about a vertical axis, the combination comprising: means for mounting said plow units to said inclined beam for rotation in a continuous manner about respective vertical axes; a real tail section mounted to the distal end of said inclined mean beam for rotation about a vertical axis and including a steering wheel; a guide beam pivotally mounted to each of said plow units and to said tail section and extending generally parallel to said inclined beam; hydraulic power actuated means controllable from the operator's position while said vehicle is in motion and connected between said guide beam and said frame for rotating said plow units together about their respective axes over a continuous range, such that the cut lines of all plow units remain parallel and define a predetermined angular relationship to said main beam to thereby provide an adjustable spacing between furrows formed by said plow units when pulled by said tractor; means for attaching said main frame to a traction vehicle for rotation about a vertical axis; and steering means connected between said vehicle and said steering wheel and responsive to the turning of said vehicle for turning said steering wheel in a direction opposite to the turning of said tractor, said steering means including compensating means for maintaining said steering wheel parallel to said plow units under normal operation for all settings of the spacing between said plow units, whereby the tail end of said plow system is caused to track the movement of said tractor during turning and said steering wheel is steered in the direction of travel of said vehicle to cause said tail section to align with the direction of travel of said vehicle for all lateral settings of said plow units.

2. The system of claim 1 wherein said tail section is pivotally mounted to the distal end of said inclined beam for rotation about a vertical axis and including a rearmost plow unit rotatable therewith, a rearwardly-extending frame, and said steering wheel is rotatably mounted to the end of said section frame and behind the rearmost plow unit.

3. The system of claim 1 wherein said plow system has a first and a second side and wherein said steering means comprises a first arm connected to rotate as said tractor turns and extending to a first side of said plow system; a tie rod pivotally connected to the distal end of said first arm and extending generally rearwardly thereof; a second arm pivotally connected at one end and to said inclined beam and extending to said first side of said plow system and pivotally connected at the other end to the distal end of said tie rod; a third arm connected to said steering wheel and extending to the second side of said plow system; and a link pivotally connected to said third arm at one end and to said second arm at the other end.

4. The system of claim 3 wherein the proximal end of said second arm is mounted to said inclined beam for rotation about the axis of rotation of the rearmost plow unit and wherein said compensation means of said steering means is characterized in that a parallelogram is formed by the axes of the pivotal connections between said tie rod and said first and second arms, the pivotal axis of said first arm relative to said plow system, and the pivotal axis of said second arm on said inclined beam.

5. The system of claim 1 wherein the rearmost plow unit is mounted to said tail section and adapted to turn therewith, and said trailing wheel is mounted to follow in the furrow formed by said rearmost plow unit.

6. The system of claim 1 further comprising power-actuated means carried by said tail section for lifting the distal end of said inclined beam and the forward end of said tail section relative to said steering wheel to adjust the height of said plows.

7. The system of claim 6 wherein said last-named power-actuated means includes a parallel linkage mechanism interconnecting said trailing wheel with said tail section and adapted to move said trailing section upwardly in adjusting the height of said plow units.

8. In a plow system adapted to be pulled behind a traction vehicle and including a plurality of plow units each provided with a ground-working implement, and a main frame including a main horizontal beam inclined relative to the direction of travel of said plow system, the combination comprising: hitch means for connecting said main beam to a traction vehicle for rotation about a vertical axis; means for mounting said plow units to said inclined beam for rotation about their respective vertical axes to adjust the lateral spacing of said units, the trailing plow unit including a rearwardly extending tail beam pivotally connected to the rear end of said inclined beam and a trailing steering wheel mounted to said tail beam to follow behind the rear ground-working implement for supporting the rear end thereof; an elongated guide beam pivotally mounted to each of said plow units and extending generally parallel to said inclined beam; power actuated means controllable from the operator's position while said vehicle is in motion for forcing said guide beam longitudinally to adjust the angular disposition of said plow units in unison; and steering means connected between said vehicle and said steering wheel and responsive to the turning of said traction vehicle for steering said trailing steering wheel to follow behind said traction vehicle during turns and including compensation means for correcting the disposition of said trailing wheel for proper alignment with said rear ground-working implement to follow therebehind for all lateral adjustments of said units; said hitch means being the only support of the forward end of said plow system, and said axes of rotation of all of said units being located relative to the vertical axis of said hitch means whereby the leading plow unit will shift a given distance sideways relative to the rear furrow wheel of said vehicle when said power actuated means is adjusted and all other plow units will move a multiple of said given distance sideways from said rear furrow wheel of said vehicle.

9. The system of claim 8 wherein said steering means comprises a link mechanism including a laterally extending first arm secured to turn with said tractor; a first elongated tie rod pivotally connected at its forward end to the distal end of said first arm; a link pivotally connected at one end for rotation about the pivotal axis between said inclined beam and said tail beam and extending laterally thereof in the same general direction as said first arm, the rear end of said first tie rod being pivotally connected to the distal end of said link; the corners of a parallelogram being defined respectively by the axis of rotation of said first arm, the pivotal connection of said first arm to said first tie rod, the pivotal connection of said tie rod to said link, and the axis of rotation of said link; said mechanism further including a second lateral arm attached to steer said steering wheel and extending to the side of said steering wheel generally opposite of the side to which said link and said first arm extend; and a second tie rod pivotally connected at a forward end to said link and pivotally connected at a rear end to the distal end of said second arm.

* * * * *

UNITED STATES PATENT AND TRADEMARK OFFICE
CERTIFICATE OF CORRECTION

PATENT NO. : 3,817,333
DATED : June 18, 1974
INVENTOR(S) : Jon E. Kinzenbaw

It is certified that error appears in the above—identified patent and that said Letters Patent is hereby corrected as shown below:

Claim 1, column 8, line 42, "real" should be -- rear --;

line 43, "mean" should be -- main --.

Signed and Sealed this

Fourteenth Day of July 1981

[SEAL]

Attest:

Attesting Officer

GERALD J. MOSSINGHOFF
Commissioner of Patents and Trademarks